May 2, 1950 H. A. WINTERMUTE 2,506,402
GAS CLEANING APPARATUS
Filed Dec. 11, 1946 5 Sheets-Sheet 1
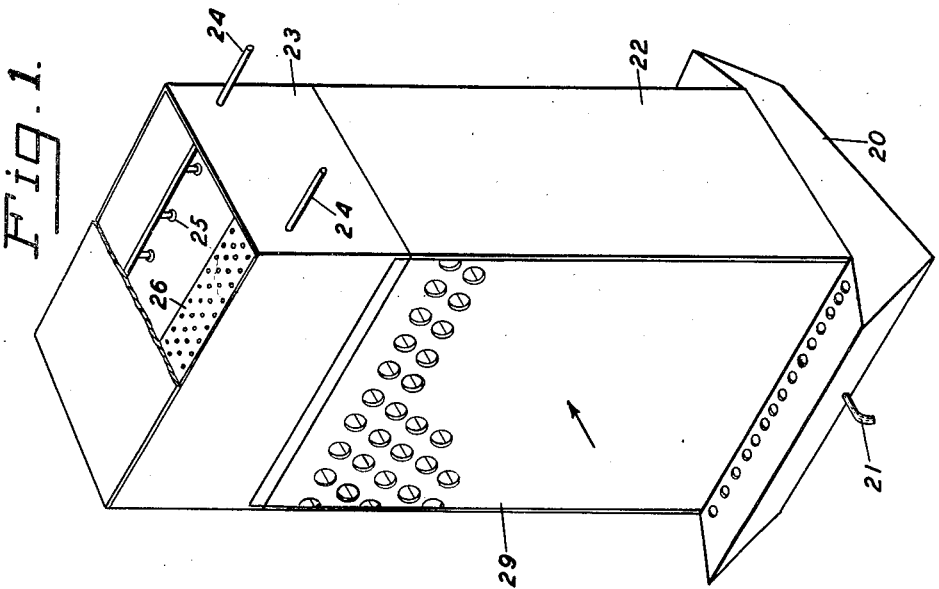
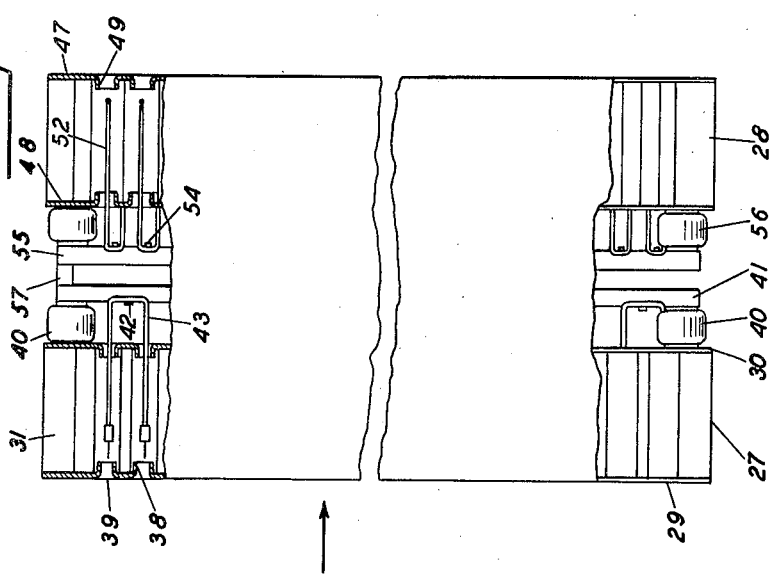
INVENTOR.
Harry A. Wintermute
BY
Stowell & Evans,
Attorneys.

May 2, 1950 H. A. WINTERMUTE 2,506,402
GAS CLEANING APPARATUS
Filed Dec. 11, 1946 5 Sheets-Sheet 2
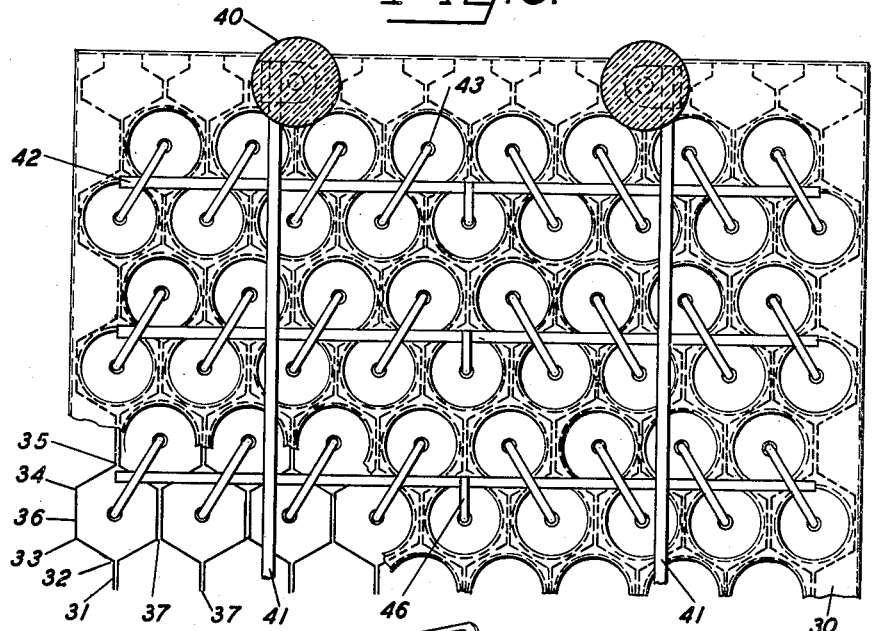
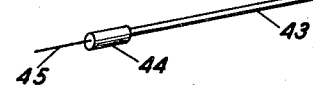
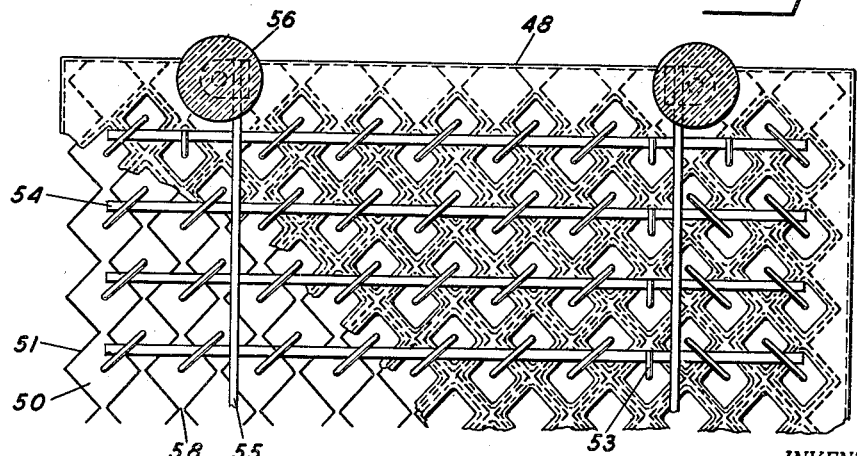
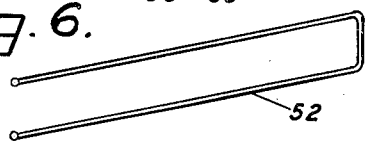
INVENTOR.
Harry A. Wintermute
BY
Stowell + Evans,
Attorneys.

May 2, 1950        H. A. WINTERMUTE        2,506,402
GAS CLEANING APPARATUS
Filed Dec. 11, 1946        5 Sheets-Sheet 3
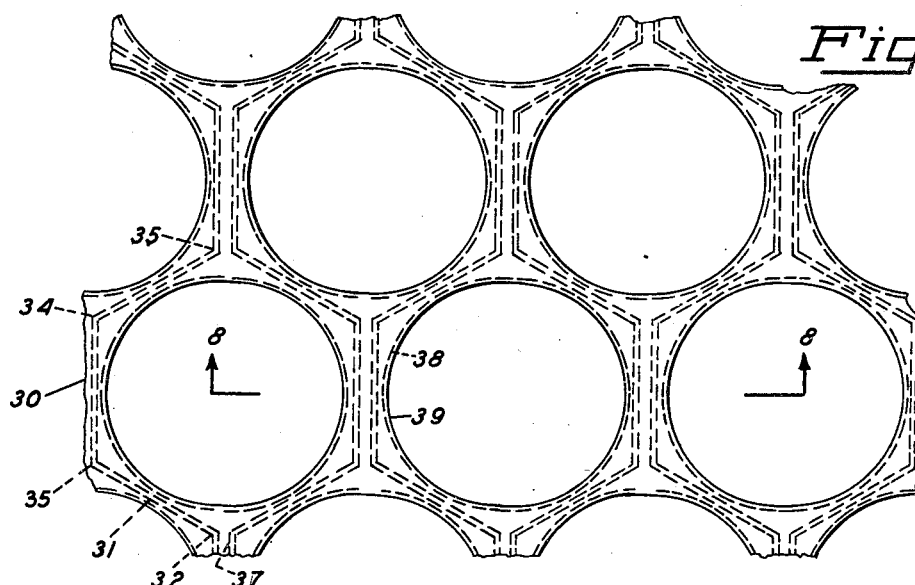
Fig. 7.
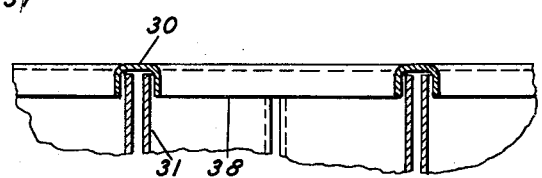
Fig. 8.
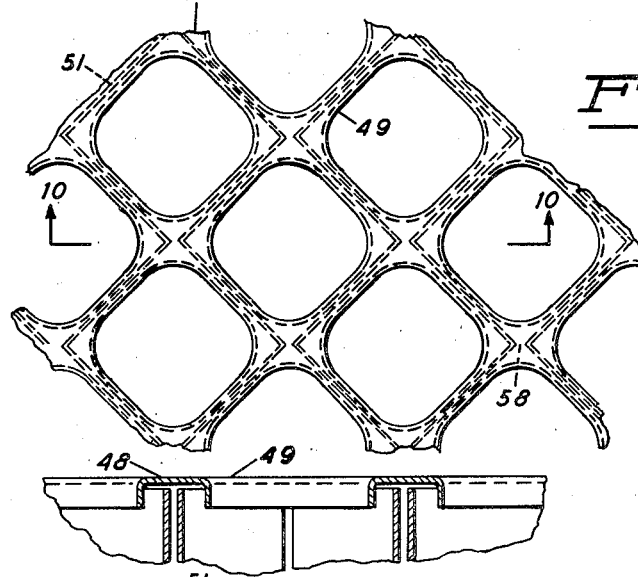
Fig. 9.
Fig. 10.
INVENTOR.
Harry A. Wintermute.
BY
Stowell & Evans,
Attorneys.

May 2, 1950     H. A. WINTERMUTE     2,506,402
GAS CLEANING APPARATUS

Filed Dec. 11, 1946     5 Sheets-Sheet 4

INVENTOR.
Harry A. Wintermute
BY
Stowell & Evans,
Attorneys.

May 2, 1950 H. A. WINTERMUTE 2,506,402
GAS CLEANING APPARATUS
Filed Dec. 11, 1946 5 Sheets-Sheet 5

INVENTOR.
Harry A. Wintermute
BY
Stowell & Evans,
Attorneys.

Patented May 2, 1950

2,506,402

UNITED STATES PATENT OFFICE 2,506,402

GAS CLEANING APPARATUS

Harry A. Wintermute, Plainfield, N. J., assignor to Research Corporation, New York, N. Y., a corporation of New York Application December 11, 1946, Serial No. 715,453

13 Claims. (Cl. 183—7)

This invention relates to gas cleaning apparatus and more particularly to electrical precipitators having improved extended surface electrode structures. In the illustrative embodiments shown and described herein, the invention is specifically concerned with electrical precipitators wherein the extended surface electrodes are washed with a liquid flushing agent.

An object of the invention is to provide gas cleaning apparatus having extended surface electrode or analogous structures in the form of strong and rigid unitary structures which preferably are removable from the gas cleaning apparatus as a unit. Such structures may or may not support complementary precipitating electrode structures.

Another object is to provide an extended surface particle collecting structure having header plates providing effective gas flow through the structure and eliminating gas flow in those zones of the structure where gas flow is not desirable.

Another object is to provide an extended surface electrode structure for electrical precipitators which minimizes tendency towards back discharge and, where the extended surface electrodes are flushed with liquid, substantially eliminates loss of flushing liquid through erosion and entrainment.

Still another object is to provide in a liquid flushed gas cleaning apparatus header plates for the extended surface particle collecting structure having orifices provided with inturned flanges which effectively prevent erosion of the flushing liquid by the gas stream passing through the apparatus.

A further object is to provide a unitary extended surface particle collecting structure accomplishing the foregoing and other objects, which structure is relatively simple and inexpensive to manufacture and which is so efficient in use as to require substantially no maintenance.

Typically, the gas cleaning apparatus of the invention has an extended surface particle collecting structure comprising a plurality of sheet members, said sheet members being rectilinear in one direction and symmetrically warped in the other direction, and positioned in generally parallel relation to provide a plurality of tiers of parallel conduits, said sheet members providing extended particle collecting surface walls to said conduits, header plates extending adjacent to the edges of said sheet members, and providing openings for the passage of gas through said parallel conduits, and interconnecting means securing said sheet members and header plates together.

The foregoing and other aims and advantages of the present invention will be in part apparent and in part pointed out in the following detailed description of several embodiments thereof taken in connection with the accompanying drawings, wherein:

Fig. 1 is a perspective view of a typical two-stage electrical precipitator embodying the principles of the invention, parts being broken away to show interior construction;

Fig. 2 is an enlarged side view of the charging and collecting sections of the precipitator shown in Fig. 1 with parts broken away to show the precipitating electrode structures;

Fig. 3 is a further enlarged detail view and partial section of the interior face of the charging section of the characteristic precipitator;

Fig. 4 is a perspective view of a double charging electrode;

Fig. 5 is a view similar to Fig. 3 of the interior face of the collecting section;

Fig. 6 is a perspective view of a double precipitating electrode for the collecting section;

Fig. 7 is a still further enlarged view of a portion of the exterior face of the charging section;

Fig. 8 is a partial sectional view taken along the line 8—8 of Fig. 7;

Fig. 9 is a view similar to Fig. 7 of a portion of the exterior face of the collecting section;

Fig. 10 is a partial sectional view taken along the line 10—10 of Fig. 9;

Figure 11:
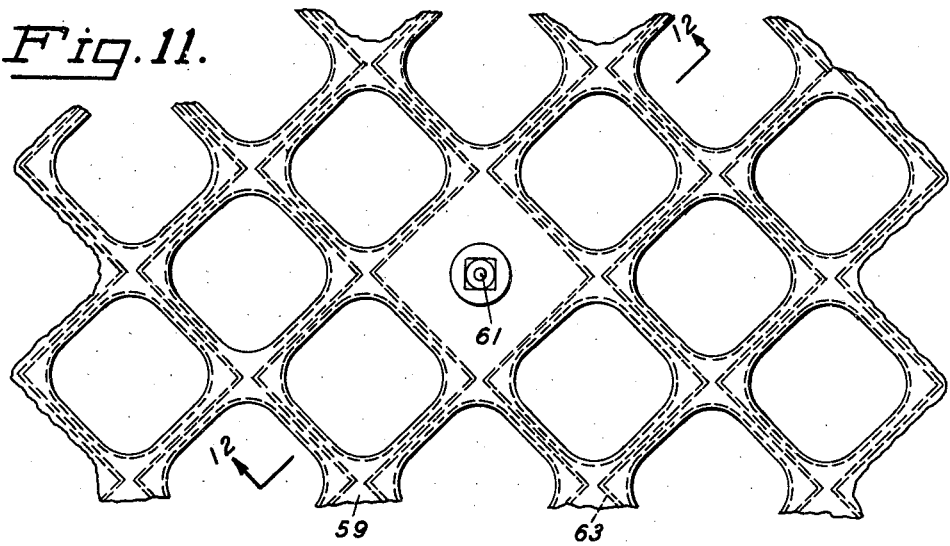
Fig. 11 is an exterior face view of a portion of a modified form of extended surface particle collecting structure in accordance with the invention.

Referring to the drawings, particularly to Figs. 1 and 2 thereof, there is shown an electrical precipitator having a sump 20 provided with an outlet 21. Vertical side walls 22 support a superstructure 23 which forms a flushing liquid distributor having liquid inlets 24, spray heads 25, and a horizontally disposed distributing screen 26.

The electrical precipitator is of the two-stage type, having a charging section 27 and a collecting section 28. The direction of gas flow through the precipitator is indicated by arrows in Figs. 1 and 2, and it will be understood that suitable conduits are provided for directing a stream of gas through the apparatus.

The extended surface electrode structure of the charging section 27 includes a pair of vertically disposed end plates or header plates 29 and 30 having arranged therebetween a plurality of vertically warped, horizontally extending sheet members 31. As can best be seen in Figs. 3, 7, and 8, the sheet members are warped in the vertical direction by bending along horizontal lines 32, 33, 34, and 35 and spaced apart to form a plurality of hexagonal, prismatic conduits 36. It will be noted that the warped sheet members are so arranged as to provide vertical channels 37 for conducting flushing liquid down each vertical tier of horizontal conduits. The warped sheet members and the header plates are secured together by interconnecting means, several examples of which will be described hereinafter, to form a unitary extended surface electrode structure which is self-supporting and which may be fabricated as a unit subassembly of the electrical precipitator.

Header plates 29 and 30 are provided with a plurality of inturned flanges 38 corresponding to the gas conduits 36. The flanged openings or holes 39 are aligned with the conduits to permit gas flow through the section.

A complementary charging electrode assembly is provided for the charging section 27. This assembly is insulated from the extended surface electrode assembly hereinbefore described by being mounted on a number of insulators 40 suitably affixed to the interior header plate 30. The charging electrode assembly shown includes a pair of vertical bars 41 to which are attached a plurality of horizontal electrode supporting bars 42, the latter carrying the charging electrode elements 43, shown in detail in Fig. 4. As is conventional, the charging electrode assembly is typically of metallic construction, the elements of which are preferably welded together at the joints.

The charging electrode shown in Fig. 4 takes the form of a U-shaped round bar 43 to the ends of which are attached by ferrules 44 short lengths of discharge wires 45. In the arrangement shown in Fig. 3, each of the U-shaped electrode elements serves two conduits 36, the separate legs of the electrode being disposed and centered in adjacent conduits. Due to the odd number of conduits in the specific arrangement shown, a single L-shaped electrode 46 is used in the central conduits. This L-shaped electrode element is very simply made by cutting in half one of the electrode elements shown in Fig. 4.

The construction of the collecting section 28, shown to best advantage in Figs. 2, 5, and 6, is similar to, but involves minor variations from, the construction of the charging section. It will accordingly be sufficient to limit the description of the collecting section to a description of these differences.

Essentially, the extended surface electrode structure of the collecting section, shown in enlarged detail in Figs. 9 and 10, is a unitary subassembly including a pair of spaced header plates 47 and 48 having inturned flange openings 49 aligned with the gas conduits 50. The gas conduits 50 are approximately square in cross section and of smaller cross-sectional area than the gas conduits 36 of the charging section. They are formed by the vertically extending vertically warped sheet members 51 that are embraced between the header plates.

The precipitating electrode assembly, including the electrode elements 52 and 53, horizontal support bars 54 and vertical bars 55, is mounted on the insulators 56 carried by the interior header plate 48.

The electrode elements 52 are of the nondischarging type and have rounded ends free from sharp points and angles to minimize any tendency for corona discharge to occur.

Referring to Fig. 2, a conducting link 57 electrically connects the charging and precipitating electrode assemblies so that a common source of high tension electric current may serve both the charging and the collecting sections.

It will be understood that a suitable source of high tension current (not shown) is provided, the high potential terminal of which may be connected to the link 57. The complementary terminal of the current source may be grounded, as is conventional, in which case, the extended surface electrode structures of the precipitator are also grounded, as by conduction through the precipitator casing or through a separate grounded conductor.

In operation, the precipitator may be continuously or intermittently flushed, the former being preferred. For this purpose, flushing liquid is fed through inlets 24 to the spray heads 25 which direct sprays of liquid upon the distributing screen 26. The liquid flows through the interstices of the screen and falls upon the upper portions of the warped extended surface members 31 and 51 and flows in a film down the surfaces of these members to wash the same free from deposited material. The distributing screen 26 may be blanked out over the area between the charging section 27 and the collecting section 28 to confine the flow of flushing liquid to these sections. Flushing liquid passes downwardly in the vertical tiers of conduits through the channels 37 and 58 and falls from the bottoms of the sheet members into the sump 20 from which it may be withdrawn through the outlet 21 and, if desired, recirculated to the spray heads 25 after being relieved of its burden of collected material, if necessary.

The header plates function to prevent loss of flushing liquid from the charging and collecting sections. Portions of the header plates overlie the edges of the warped sheet members providing somewhat restricted end openings for the gas conduits. This construction reduces air flow near the liquid covered surfaces of the warped sheet members thus minimizing pickup and entrainment of liquid in the gas stream. Also, the inturned flanges provide traps for the ends of the conduits which prevent loss of liquid by bleeding from the downstream edges of the warped sheet members. Additionally, the inturned flanges eliminate sharp edges at the openings in the header plates and thus prevent undue corona discharge at these points and minimize the formation of ozone.

There are zones near the corners of the gas conduits somewhat out of range of effective influence of the high voltage electrodes. The construction and arrangement of the header plates reduces the air flow in these zones where the influence of the high voltage electrodes is reduced thus permitting more efficient charging and precipitation in these zones.

Figure 12:
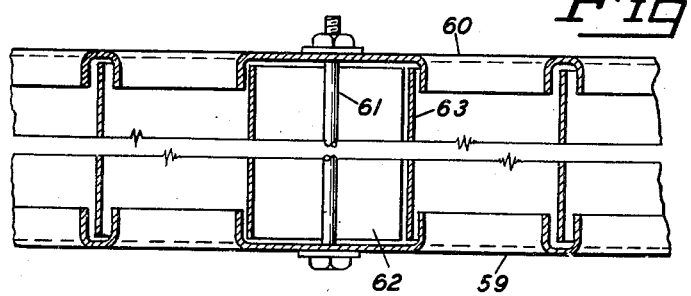
Fig. 12 is a sectional view taken along the line 12—12 of Fig. 11.

One specific form of interconnecting means for securing together the warped sheet members and the header plates is shown in Figs. 11 and 12. In this construction, stay bolts are employed to draw opposed header plates towards each other whereby to clamp the warped extended surface members therebetween. In these figures, the header plates 59 and 60 are pulled together by stay bolts 61 passing through blanked out conduits 62. The warped sheet members 63 are firmly supported at their lateral edges by the clamping pressure of the header plates. It will be understood that a convenient number of stay bolts are employed in each structure.

Figure 13:
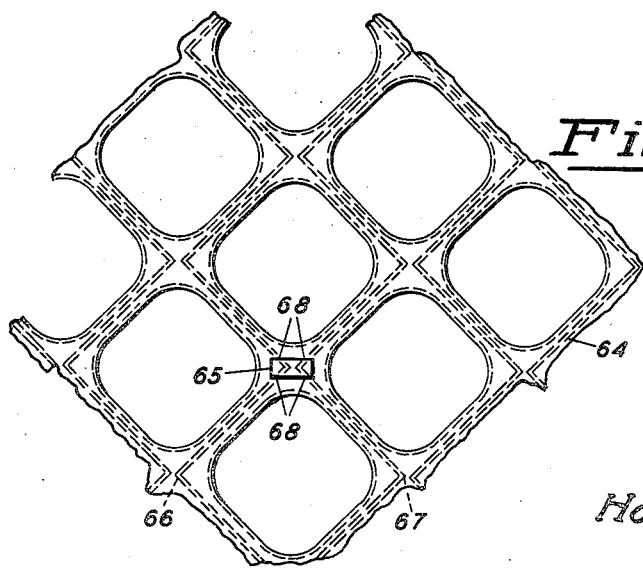
Fig. 13 is an exterior face view of a portion of another modification of extended surface particle collecting structure.

Another form of securing means is shown in Fig. 13 wherein the header plate 64 is provided with small rectangular openings 65 at selected points of closest approach of two adjacent warped sheet members 66 and 67. The edges of the sheet members are secured to the header plate by means of tack welding applied through the opening 65 at points 68.

Figure 14:
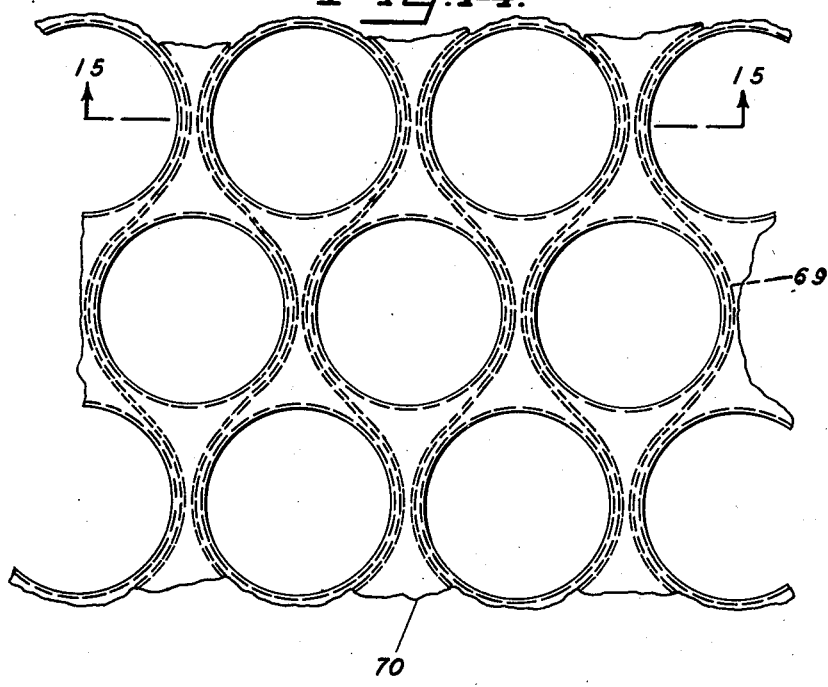
Fig. 14 is an exterior face view of still another modification of extended surface particle collecting structure.
Figure 15:
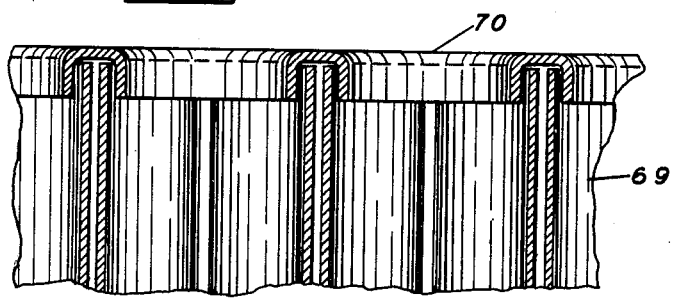
Fig. 15 is a partial sectional view taken along the line 15—15 of Fig. 14.

Figs. 14 and 15 show a modification of the extended surface structure which differs from those shown in the previously described figures primarily in that the extended sheet members 69 are sinuously warped instead of being warped by bending along definite lines. The sheet members 69 and header plates 70 may be assembled in any desired manner.

From the foregoing description it will be seen that the present invention provides a gas cleaning apparatus having an extended surface particle collecting structure of improved utility, which structure, while particularly adapted to electrical precipitators of the single- or two-stage type, either liquid flushed or dry, is also adapted to related gas cleaning devices.

This application contains subject matter in common with my prior application Serial No. 576,734, filed February 8, 1945, now U. S. Patent 2,443,780, issued June 22, 1948, but no subject matter disclosed in the prior application is claimed herein.

I claim:

1. In gas cleaning apparatus, an extended surface particle collecting structure comprising a plurality of sheet members, rectilinear in one direction and symmetrically warped in the other direction, and positioned in generally parallel relation to provide a plurality of tiers of parallel conduits, said sheet members providing extended particle collecting walls to said conduits, header plates extending adjacent to the edges of said sheet members and providing openings for the passage of gas through said parallel conduits, and means securing said sheet members and said header plates together.

2. In gas cleaning apparatus, a unitary extended surface particle collecting structure comprising a plurality of sheet members, rectilinear in one direction and symmetrically warped in the other direction, and positioned in generally parallel relation to provide a plurality of tiers of parallel conduits, said sheet members providing extended particle collecting surface walls to said conduits, header plates extending adjacent to the edges of said sheet members, and providing openings for the passage of gas through said parallel conduits, and means securing said sheet members and header plates together to form a unitary structure.

3. In gas cleaning apparatus, a unitary extended surface particle collecting structure comprising a plurality of sheet members, rectilinear in one direction and symmetrically warped in the other direction, and positioned in generally parallel relation to provide a plurality of tiers of parallel conduits, said sheet members providing extended particle collecting surface walls to said conduits, header plates extending adjacent to the edges of said sheet members, and providing openings for the passage of gas through said parallel conduits, inturned flanges surrounding said openings and extending into said conduits, and means securing said sheet members and header plates together to form a unitary structure.

4. An electrical precipitator comprising a plurality of sheet members, rectilinear in one direction and symmetrically warped in the other direction, and positioned in generally parallel spaced relation to provide a plurality of tiers of parallel conduits, said sheet members providing extended collecting electrode surface walls to said conduits, header plates extending adjacent to the edges of said sheet members and providing openings for the passage of gas through said parallel conduits, means securing said sheet members and header plates together, and precipitating electrode means positioned in each of said conduits.

5. An electrical precipitator comprising a plurality of sheet members, rectilinear in one direction and symmetrically warped in the other direction, and positioned in generally parallel spaced relation to provide a plurality of tiers of parallel conduits, said sheet members providing extended collecting electrode surface walls to said conduits, header plates extending adjacent to the edges of said sheet members and providing openings for the passage of gas through said parallel conduits, inturned flanges surrounding said openings and extending into said conduits, means securing said sheet members and header plates together, and precipitating electrode means positioned in each of said conduits.

6. An electrical precipitator comprising a plurality of sheet members, rectilinear in one direction and symmetrically warped in the other direction, and positioned in generally parallel spaced relation to provide a plurality of tiers of parallel conduits, said sheet members providing extended collecting electrode surface walls to said conduits, header plates extending adjacent to the edges of said sheet members and providing openings for the passage of gas through said parallel conduits, tension members securing said header plates together to clamp said sheet members between said header plates, and precipitating electrode means positioned in each of said conduits.

7. An electrical precipitator comprising a plurality of sheet members, rectilinear in one direction and symmetrically warped in the other direction, and positioned in generally parallel spaced relation to provide a plurality of tiers of parallel conduits, said sheet members providing extended collecting electrode surface walls to said conduits, header plates extending adjacent to the edges of said sheet members and providing openings for the passage of gas through said parallel conduits, means rigidly connecting said header plates to said sheet members, and precipitating electrode means positioned in each of said conduits.

8. An electrical precipitator comprising a plurality of sheet members, rectilinear in one direction and symmetrically warped in the other direction, and positioned in generally parallel spaced relation to provide a plurality of tiers of parallel conduits, said sheet members providing extended collecting electrode surface walls to said conduits, header plates extending adjacent to the edges of said sheet members and providing openings for the passage of gas through said parallel conduits, said header plates being welded to said sheet members, and precipitating electrode means positioned in each of said conduits.

9. An electrical precipitator comprising a plurality of sheet members rectilinear in the horizontal direction and symmetrically warped in the vertical direction, and positioned in generally parallel spaced relation to define a plurality of vertical tiers of parallel horizontal conduits, the vertically adjacent conduits of which communicate with each other through restricted horizontal slots, said sheet members providing extended collecting electrode surface walls to said conduits, means for applying a flushing liquid to the walls of the upper of said conduits, vertical header plates extending adjacent to the edges of said sheet members and providing openings for the passage of gas through said conduits, means securing said sheet members and header plates together, and horizontal precipitating electrode means positioned in each of said conduits.

10. An electrical precipitator comprising a plurality of sheet members rectilinear in the horizontal direction and symmetrically warped in the vertical direction, and positioned in generally parallel spaced relation to define a plurality of vertical tiers of parallel horizontal conduits, the vertically adjacent conduits of which communicate with each other through restricted horizontal slots, said sheet members providing extended collecting electrode surface walls to said conduits, means for applying a flushing liquid to the walls of the upper of said conduits, vertical header plates extending adjacent to the edges of said sheet members and providing openings for the passage of gas through said conduits, inturned flanges surrounding said openings and extending into said conduits, means securing said sheet members and header plates together, and horizontal precipitating electrode means positioned in each of said conduits.

11. An electrical precipitator comprising a plurality of sheet members rectilinear in the horizontal direction and symmetrically warped in the vertical direction, and positioned in generally parallel spaced relation to define a plurality of vertical tiers of parallel horizontal conduits, the vertically adjacent conduits of which communicate with each other through restricted horizontal slots, said sheet members providing extended collecting electrode surface walls to said conduits, means for applying a flushing liquid to the walls of the upper of said conduits, vertical header plates extending adjacent to the edges of said sheet members and providing openings for the passage of gas through said conduits, tension members securing said header plates together to clamp said sheet members between said header plates, and horizontal precipitating electrode means positioned in each of said conduits.

12. An electrical precipitator comprising a plurality of sheet members rectilinear in the horizontal direction and symmetrically warped in the vertical direction, and positioned in generally parallel spaced relation to define a plurality of vertical tiers of parallel horizontal conduits, the vertically adjacent conduits of which communicate with each other through restricted horizontal slots, said sheet members providing extended collecting electrode surface walls to said conduits, means for applying a flushing liquid to the walls of the upper of said conduits, vertical header plates extending adjacent to the edges of said sheet members and providing openings for the passage of gas through said conduits, means rigidly connecting said header plates to said sheet members, and horizontal precipitating electrode means positioned in each of said conduits.

13. An electrical precipitator comprising a plurality of sheet members rectilinear in the horizontal direction and symmetrically warped in the vertical direction, and positioned in generally parallel spaced relation to define a plurality of vertical tiers of parallel horizontal conduits, the vertically adjacent conduits of which communicate with each other through restricted horizontal slots, said sheet members providing extended collecting electrode surface walls to said conduits, means for applying a flushing liquid to the walls of the upper of said conduits, vertical header plates extending adjacent to the edges of said sheet members and providing openings for the passage of gas through said conduits, said header plates being welded to said sheet members, and horizontal precipitating electrode means positioned in each of said conduits.

HARRY A. WINTERMUTE.

REFERENCES CITED

The following references are of record in the file of this patent:

UNITED STATES PATENTS

| Number | Name | Date |
|---|---|---|
| 1,329,825 | Bradley | Feb. 3, 1920 |
| 1,848,579 | Seipp | Mar. 8, 1932 |
| 2,067,560 | Bollheimer | Jan. 12, 1937 |
| 2,409,563 | Hedberg | Oct. 15, 1946 |

FOREIGN PATENTS

| Number | Country | Date |
|---|---|---|
| 116,512 | Great Britain | Mar. 20, 1917 |
| 380,890 | Great Britain | Sept. 29, 1937 |
| 677,102 | Germany | Aug. 1, 1940 |
| 701,416 | Germany | Jan. 16, 1941 |